US009922629B1

(12) United States Patent
Whiteside

(10) Patent No.: US 9,922,629 B1
(45) Date of Patent: Mar. 20, 2018

(54) APPARATUS FOR DISPLAYING SHEET MUSIC

(71) Applicant: Kenneth Whiteside, Conroe, TX (US)

(72) Inventor: Kenneth Whiteside, Conroe, TX (US)

( * ) Notice: Subject to any disclaimer, the term of this patent is extended or adjusted under 35 U.S.C. 154(b) by 0 days.

(21) Appl. No.: 15/375,111

(22) Filed: Dec. 11, 2016

(51) Int. Cl.
*G09B 15/00* (2006.01)
*G10G 1/00* (2006.01)
*A47B 19/00* (2006.01)

(52) U.S. Cl.
CPC ............. *G10G 1/00* (2013.01); *A47B 19/002* (2013.01); *G10H 2210/105* (2013.01); *G10H 2220/015* (2013.01); *G10H 2240/211* (2013.01); *G10H 2240/285* (2013.01)

(58) Field of Classification Search
CPC ....... G10H 2220/015; G10H 2220/211; G06N 99/005
See application file for complete search history.

(56) References Cited

U.S. PATENT DOCUMENTS

| | | | | |
|---|---|---|---|---|
| 5,689,077 | A * | 11/1997 | Jasinski | G09B 15/002 84/477 R |
| 5,760,323 | A * | 6/1998 | Romero | G10H 1/0008 84/470 R |
| 8,431,809 | B1 * | 4/2013 | Chan | G09B 15/02 84/470 R |
| 2001/0037719 | A1 * | 11/2001 | Gardner | G09B 15/023 84/478 |
| 2003/0024375 | A1 * | 2/2003 | Sitrick | G09B 15/002 84/477 R |
| 2003/0100965 | A1 * | 5/2003 | Sitrick | G09B 15/023 700/83 |
| 2003/0110925 | A1 * | 6/2003 | Sitrick | G09B 15/002 84/477 R |
| 2003/0110926 | A1 * | 6/2003 | Sitrick | G09B 15/023 84/477 R |
| 2005/0204889 | A1 * | 9/2005 | Swingle | G10G 1/00 84/100 |
| 2008/0047413 | A1 * | 2/2008 | Laycock | G09B 5/12 84/477 R |
| 2008/0127809 | A1 * | 6/2008 | Fu | G09B 15/023 84/477 R |
| 2008/0156171 | A1 * | 7/2008 | Guldi | G09B 15/002 84/466 |
| 2009/0217803 | A1 * | 9/2009 | Guo | G10G 1/00 84/477 R |
| 2011/0203442 | A1 * | 8/2011 | Raveendran | G10G 1/00 84/483.1 |
| 2013/0042746 | A1 * | 2/2013 | Shau | G09B 15/023 84/483.1 |
| 2013/0319209 | A1 * | 12/2013 | Good | G09B 15/04 84/483.2 |

(Continued)

*Primary Examiner* — Marlon Fletcher
(74) *Attorney, Agent, or Firm* — RG Patent Consulting, LLC; Rachel Gilboy

(57) ABSTRACT

An improved apparatus for displaying sheet music is an electronic tablet having the ability to upload and download sheet music to the device as well as having the ability to provide a music composer with the tools to put the music easily and conveniently in printed form. Sound recognition allows the tablet to recognize audio sequences of music and locate the place in the electronic music sheets on the tablet to keep the proper location displayed for the user-performer, including automatically turning electronic pages during the playing of a piece of music.

17 Claims, 3 Drawing Sheets

(56) References Cited

U.S. PATENT DOCUMENTS

| | | | | |
|---|---|---|---|---|
| 2014/0033899 | A1* | 2/2014 | Dripps | G09B 5/06<br>84/483.1 |
| 2014/0041512 | A1* | 2/2014 | Mastran | G09B 15/023<br>84/483.2 |
| 2014/0123834 | A1* | 5/2014 | Wang | G10G 1/00<br>84/486 |
| 2014/0320442 | A1* | 10/2014 | Chan | G09B 15/023<br>345/174 |
| 2015/0364055 | A1* | 12/2015 | Oliver | G09B 15/023<br>84/746 |

* cited by examiner

APPARATUS FOR DISPLAYING SHEET MUSIC

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of sheet music and more specifically relates to an improved apparatus for displaying sheet music.

2. Description of the Related Art

Musicians use sheet music with a stand holding the sheet music at a convenient height most generally when practicing musical instrument skills or when practicing musical compositions. Often, the music has numerous notes and musical notations for the artist to follow that are too numerous to remember. Because of this, when musicians perform for audiences they generally use sheet music supported at the right height by a stand. Performances have been done like this for centuries, especially for the more complicated compositions. This method of viewing sheet music is not without its complications though. For instance, when a musician needs both hands to play his instrument and the sheet music for the song spans more than two pages, the musician must turn the page to view what is not able to be printed on the first two pages. This causes a pause that can be very noticeable and can ruin a perfect performance.

Musicians must have stacks of books having the sheet music in them to get the cross-section of songs they want for their use, or must store scores of music sheets and then locate the desired music sheets when wanting to play them. The lighting must be good enough for the musician to see the pages clearly which is not always the case when playing certain venues. Sometimes the venues are outdoors and a slight breeze can blow the sheet music away in the middle of a performance causing embarrassment and ruining the performance. While sheet music can be cost effective when purchasing only a limited number of sheets, the drawbacks can be considerable. A solution is needed that will address the above mentioned problems.

Various attempts have been made to solve the above-mentioned problems such as those found in U.S. Pat. No. 8,445,766 to Vijayalakshmi Raveendran; U.S. Publication No. 20130319209 to Good et al.; and U.S. Publication No. 20080196575 to Michael Good. This art is representative of displaying sheet music on a video screen. None of the above inventions and patents, taken either singly or in combination, is seen to describe the invention as claimed.

Ideally, sheet music should provide convenient locating and displaying as well as backlighting and automatic page turning of sheet music, and yet, would operate reliably and be manufactured at a modest expense. Thus, a need exists for a reliable improved apparatus for displaying sheet music to avoid the above-mentioned problems.

BRIEF SUMMARY OF THE INVENTION

In view of the foregoing disadvantages inherent in the known sheet music art, the present invention provides a novel improved apparatus for displaying sheet music. The general purpose of the present invention, which will be described subsequently in greater detail, is to provide convenient locating and displaying as well as backlighting and automatic page turning of sheet music.

The improved apparatus for displaying sheet music preferably comprises a computer module that includes a housing having an interior volume, a display screen located upon the exterior surface of the housing that is adapted to electronically display sheet music, Computer circuitry located within the interior volume of the housing that is electronically connected to the display screen that includes software coding adapted to store and to display the sheet music upon the display screen, and a music stand that includes a base portion for supporting a music stand on a supporting surface, a post portion that is attached to and extends upwardly from the base portion, and a sheet music holding portion to retain the computer module on so that the user can view sheet music on the display screen while playing an instrument.

The software coding preferably is adapted to electronically display sheet music on the display screen in a timed sequence that is adjustable by the user. The computer module further may include a microphone member attached to the housing that is adapted to send electronic signals to the computer circuitry that includes sound recognition and is adapted to interpret the electronic signals from the microphone member to determine which instrument the user is playing. The computer module further includes a USB connector member adapted to allow uploading music to the computer circuitry. The computer module further includes a power source located within the interior volume of the housing that is electronically connected to the display screen and the computer circuitry. The computer module further may include a wireless internet connection member that is adapted to allow wireless internet connection to and from the computer module. The computer circuitry may be adapted to provide the appropriate sheet music to the display screen for the instrument detected. The computer circuitry is pre-programmed with works of music and is re-programmable to change or to add other music as desired. The display screen may be an LCD screen or a plasma panel but is adapted to have touch screen technology. A feature of the computer circuitry is that it is adapted to highlight the notes as they are played by the user, and to automatically advance the pages of the sheet music as the user comes to the end of a specific segment or measure of the sheet music. The sound recognition software provides for the software to recognize sound patterns being played and locate in the sheet music the recognized patterns. The user may also touch the screen to quickly locate the computer at the desired location in the sheet music. The computer circuitry is preferably adapted to allow a user to write and create music besides preloaded or downloaded songs.

The base portion includes three elongated leg members forming a tripod. The post portion is formed as two elongated members telescopingly and releasably connected to one another to allow height adjustment of the sheet music holding portion. Sheet music holding portion includes at least one attachment member adapted to securely and releasably hold the computer module thereon. The computer module further may include a light source attached thereto for use by the user.

The present invention holds significant improvements and serves as an improved apparatus for displaying sheet music. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, improved apparatus for displaying sheet music, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to sheet music and more particularly to an improved apparatus for displaying sheet music as used to improve the convenience of locating and displaying sheet music as well as backlighting and automatic page turning.

Generally speaking, an improved apparatus for displaying sheet music is an electronic tablet having the ability to upload and download sheet music to the device as well as having the ability to provide a music composer with the tools to put the music easily and conveniently in printed form. Sound recognition allows the tablet to recognize audio sequences of music and locate the place in the electronic music sheets on the tablet to keep the proper location displayed for the user-performer, including automatically turning electronic pages during the playing of a piece of music.

Figure 1:
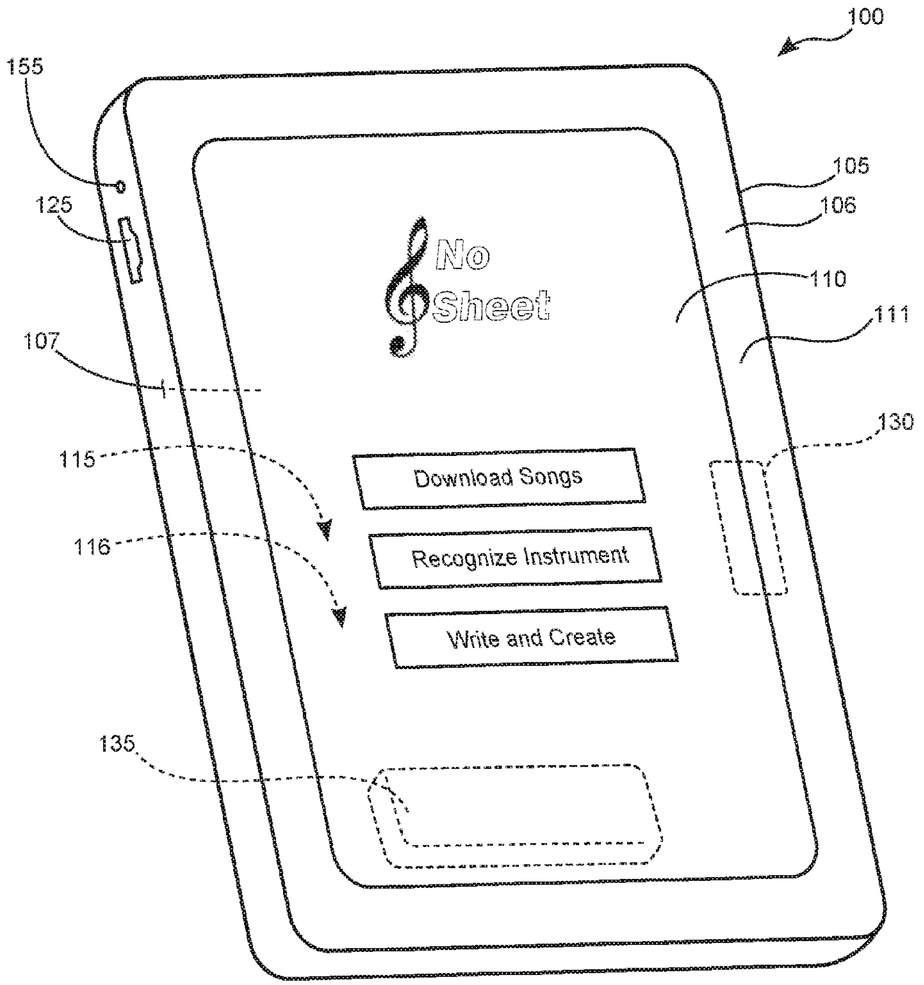
FIG. 1 shows a perspective view illustrating an improved apparatus for displaying sheet music according to an embodiment of the present invention.

Referring to the drawings by numerals of reference there is shown in FIG. 1, a perspective view illustrating improved apparatus for displaying sheet music 100 according to an embodiment of the present invention.

Improved apparatus for displaying sheet music 100 preferably comprises computer module 105 that includes housing 106 having interior volume 107, display screen 110 located upon exterior surface 111 of housing 106 that is adapted to electronically display sheet music, computer circuitry 115 located within interior volume 107 of housing 106 that is electronically connected to display screen 110 that includes software coding 116 adapted to store and to display sheet music 170 upon display screen 110, and music stand 120 that includes base portion 121 for supporting music stand 120 on a supporting surface, post portion 122 that is attached to and extends upwardly from base portion 121, and sheet music holding portion 123 to retain computer module 105 on so that the user can view sheet music 170 on display screen 110 while playing an instrument.

Figure 2:
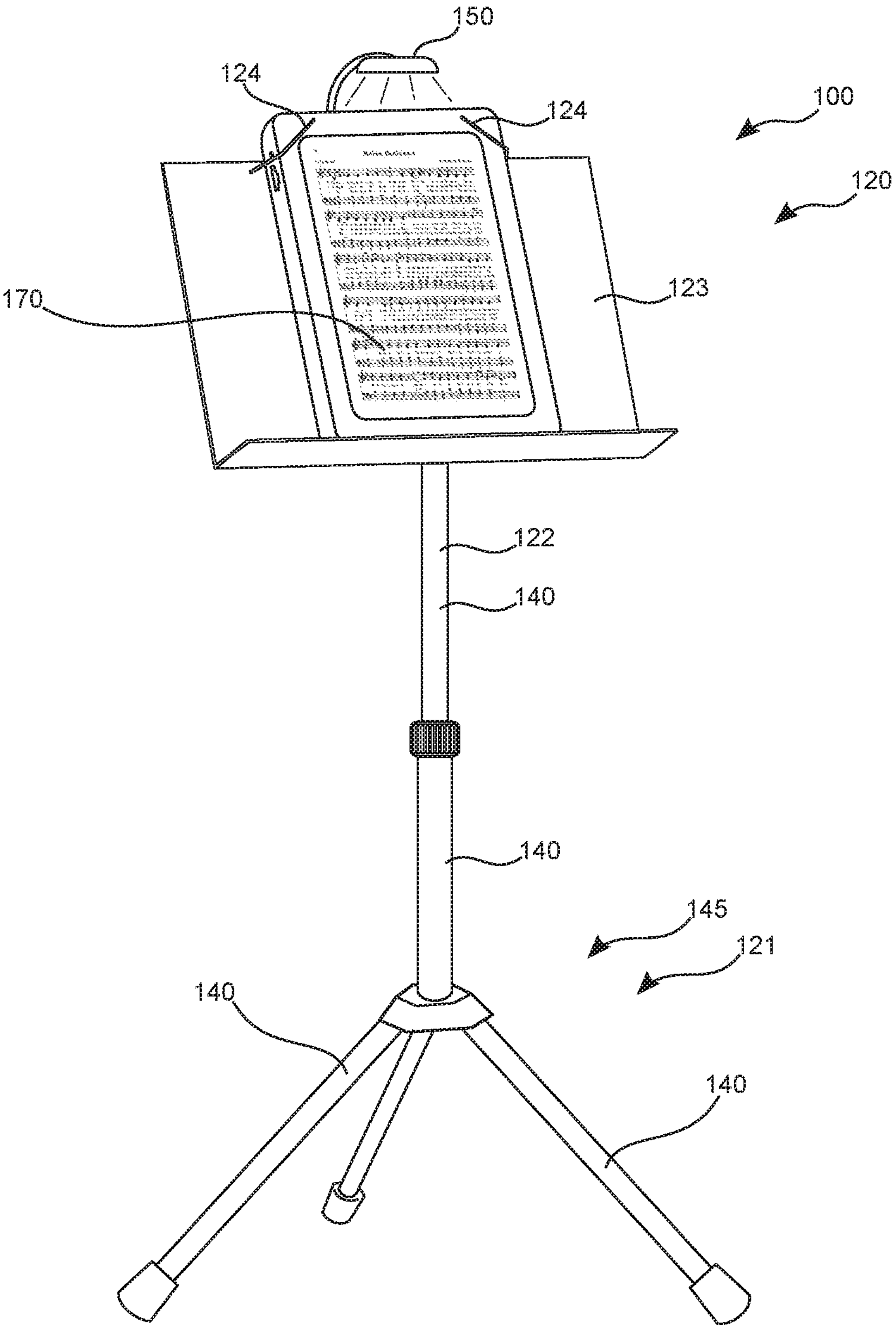
FIG. 2 is a perspective view illustrating an improved apparatus for displaying sheet music with a music stand according to an embodiment of the present invention of FIG. 1.

Referring now to FIG. 2, is a perspective view illustrating improved apparatus for displaying sheet music 100 with music stand 120 according to an embodiment of the present invention of FIG. 1.

Display screen 110 may be an LCD screen or a plasma panel but is adapted to have touch screen technology. A feature of computer circuitry 115 is that it is adapted to highlight the notes as they are played by the user, and to automatically advance the pages of sheet music 170 as the user comes to the end of a specific segment or measure of sheet music 170. The sound recognition software provides for software coding 116 to recognize sound patterns being played and locate in sheet music 170 the recognized patterns. The user may also touch display screen 110 to quickly locate and highlight the desired location in sheet music 170. Computer circuitry 115 is preferably adapted to allow a user to write and create music besides just having the preloaded or downloaded sheet music 170.

Base portion 121 includes three elongated members 140 forming a tripod. Post portion 122 is formed as two elongated members 140 telescopingly and releasably connected to one another to allow height adjustment of sheet music holding portion 123. Sheet music holding portion 123 includes at least one attachment member 124 adapted to securely and releasably hold computer module 105 thereon. Computer module 105 further may include light source 150 attached thereto for use by the user.

Figure 3:
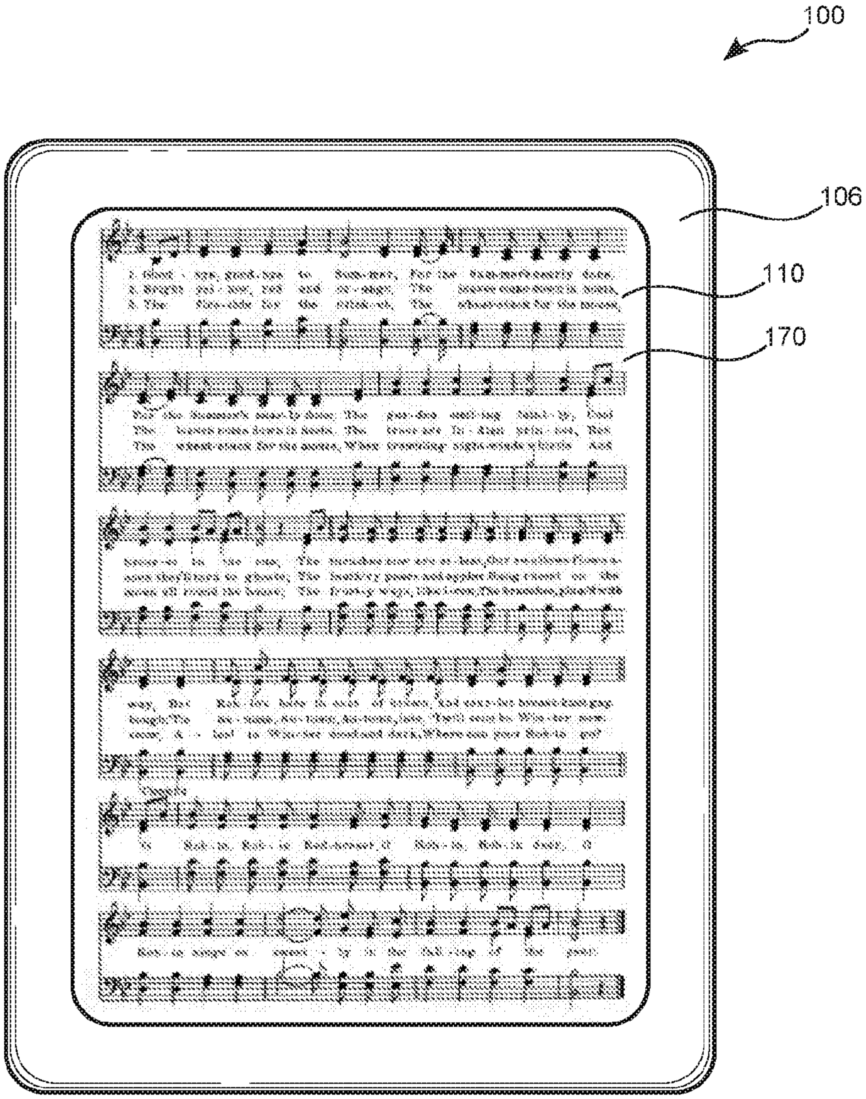
FIG. 3 is a perspective view illustrating an improved apparatus for displaying sheet music with sheet music displayed according to an embodiment of the present invention of FIG. 1.

Referring now to FIG. 3, is a perspective view illustrating improved apparatus for displaying sheet music 100 with sheet music displayed according to an embodiment of the present invention of FIG. 1.

Software coding 116 preferably is adapted to electronically display sheet music 170 on display screen 110 in a timed sequence that is adjustable by the user. Computer module 105 further may include a microphone member 155 attached to housing 106 that is adapted to send electronic signals to computer circuitry 115 that includes sound recognition and is adapted to interpret the electronic signals from microphone member 155 to determine which instrument the user is playing. Computer module 105 further includes USB connector member 125 adapted to allow uploading music to computer circuitry 115. Computer module 105 further includes power source 135 located within interior volume 107 of housing 106 that is electronically connected to display screen 110 and computer circuitry 115. Computer module 105 further may include wireless internet connection member 175 that is adapted to allow wireless internet connection to and from computer module 105. Computer circuitry 115 may be adapted to provide the appropriate sheet music 170 to display screen 110 for the instrument detected. Computer circuitry 115 is pre-programmed with works of music and is re-programmable to change or to add other sheet music 170 as desired.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An improved apparatus for displaying sheet music, comprising:

a computer module including:

a housing having an interior volume;

a display screen;

wherein said display screen is located upon an exterior surface of said housing and is adapted to electronically display sheet music;

computer circuitry;

wherein said computer circuitry is located within said interior volume of said housing, is electronically connected to said display screen, and includes software coding thereon adapted to store and display said sheet music upon said display screen; and a music stand including:

a base portion;

wherein said base portion is adapted to support said music stand on a supporting surface;

a post portion;

wherein said post portion is attached to and extends upwardly from said base portion; and a sheet music holding portion;

wherein said sheet music holding portion is adapted to retain said computer module thereon, such that a user can view sheet music on said display screen while playing an instrument;

wherein said computer module further includes a microphone member attached to said housing and is adapted to send electronic signals to said computer circuitry; and wherein said computer circuitry of said computer module is adapted to interpret said electronic signals from said microphone member to determine which instrument said user is playing.

2. The apparatus of claim 1, wherein said software coding is adapted to electronically display sheet music on said display screen in a timed sequence.

3. The apparatus of claim 1, wherein said computer circuitry is adapted to provide appropriate sheet music to said display screen for said instrument detected.

4. The apparatus of claim 1, wherein said computer circuitry is pre-programmed with works of music.

5. The apparatus of claim 1, wherein said computer module further includes a USB connector member adapted to allow uploading music to said computer circuitry.

6. The apparatus of claim 1, wherein said computer module further includes a wireless internet connection member adapted to allow wireless internet connection to and from said computer module.

7. The apparatus of claim 1 wherein said display screen is formed as an LCD screen.

8. The apparatus of claim 1 wherein said display screen is formed as a plasma panel.

9. The apparatus of claim 1 wherein said display screen includes touch screen technology.

10. The apparatus of claim 1, wherein said computer module further includes a power source located within said interior volume of said housing and is electronically connected to said display screen and said computer circuitry.

11. The apparatus of claim 1, wherein said computer circuitry is re-programmable.

12. The apparatus of claim 1, wherein said post portion is formed as two elongated members telescopingly releasably connected to one another to allow height adjustment of said sheet music holding portion.

13. The apparatus of claim 3, wherein said computer circuitry is adapted to highlight notes as they are played by the user, and automatically advancing the pages of said sheet music as said user comes to the end of a specific segment or measure of said sheet music.

14. The apparatus of claim 1, wherein said computer circuitry is adapted to allow a user to write and create their own music.

15. The apparatus of claim 1, wherein said base portion includes three elongated leg members forming a tripod.

16. The apparatus of claim 1, wherein said computer module further includes a light source attached thereto for use by said user.

17. The apparatus of claim 1, wherein sheet music holding portion includes at least one attachment member adapted to securely and releasably hold said computer module thereon.

* * * * *